2,805,248
Patented Sept. 3, 1957

United States Patent Office

2,805,248
PROCESS FOR THE PRODUCTION OF CARBOXYLIC ACIDS AND THEIR ESTERS

Herbert Friederich, Worms, and Adolf Hrubesch, Ludwigshafen am Rhine, Germany, assignors to Badische Anilin- & Soda-Fabrik Aktiengesellschaft, Ludwigshafen am Rhine, Germany No Drawing. Application April 6, 1954,
Serial No. 421,422

Claims priority, application Germany April 11, 1953

8 Claims. (Cl. 260—488)

This invention relates to the production of carboxylic acids and their esters by the interaction of alcohols with carbon monoxide in the presence of novel carbonylation catalysts. More particularly, our invention relates to heating a lower aliphatic saturated alcohol with carbon monoxide or a mixture thereof with hydrogen under superatmospheric pressure in the liquid phase in the presence of novel carbonylation catalysts. It still more specific terms our invention is directed to the synthesis of low molecular saturated aliphatic carboxylic acids and their esters by treating lower aliphatic saturated alcohols with carbon monoxide-containing gases under superatmospheric pressure at elevated temperatures in the presence of specific cobalt catalysts.

It has been known that alcohols, in particular methanol, may be carbonylated to form carboxylic acids containing one more carbon atom than the starting material and their esters. In these carbonylations either carbon monoxide or mixtures thereof with hydrogen have been used, the reaction conditions as to temperatures and pressures have been varied to a large extent and a number of catalysts have been proposed.

It is generally accepted today that carbonyl-forming metals or their compounds are the most active catalysts for such carbonylations. They are far superior to other catalysts both in rate of conversion and yields of the desired materials. Nevertheless, the known carbonylation catalysts of this type have some drawbacks. The best catalysts so far known have been nickel and cobalt compounds in combination with iodine either in elemental form or in the form of compounds. Iodine and its compounds are expensive and likely to cause corrosion in the high pressure equipment to be used.

It is an object of our invention to provide for the carbonylation of alcohols with carbon monoxide catalysts which give satisfactory rates of conversion and yields and are free from the drawback mentioned above.

According to our invention the reaction of methanol and other alcohols is carried out in the presence of catalysts which contain in addition to a cobalt salt and halogen also an N-mono- or N-disubstituted carboxylic acid amide.

The catalysts according to our invention thus contain three ingredients. The first is the cobalt salt, the second is the halogen, and the third is the carboxylic acid amide.

As cobalt salts we use the carboxylic acid salts of cobalt. In principle it does not matter which carboxylic acid is used for making this ingredient of the catalyst. Whatever carboxylic acid salt or cobalt is used it will be converted sooner or later in the course of the reaction into the cobalt salt of the carboxylic acid which is formed by the carbonylation of the alcohol used as starting material. To cite an example, we may start with cobalt propionate and use it in the carbonylation of methanol to acetic acid. The distillation residue of the reaction mixture then will contain a substantial part of the cobalt in the form of cobalt acetate. By repeated use of the catalyst all of the cobalt will finally be combined with the acetic acid. In a preferred form of our invention we use from the beginning cobalt salts derived from those carboxylic acids which are formed in the carbonylation of the alcohols used as starting material. We may also use other carboxylic acid salts of cobalt, for example, those derived from higher fatty acids, cycloaliphatic carboxylic acids, aromatic carboxylic acids, or resin acids.

The second ingredient of our catalysts is halogen either in the free form or in the form of halogen compounds. While we may use also iodine as the halogen, we prefer to carry out the invention in the presence of chlorine or bromine either in the elemental form or in the form of chlorine or bromine compounds. A preferred form of our catalysts contains these halogens in the form of chlorinated or brominated hydrocarbons. Also in this respect we may use chlorinated or brominated hydrocarbons the carbon number of which corresponds to that of the alcohol to be carbonylated. Generally speaking, we use in the carbonylation of aliphatic alcohols chlorinated or brominated fully saturated aliphatic hydrocarbons containing up to 6 carbon atoms. When, on the other hand, carbonylating, for example, benzyl alcohol, we prefer to use benzyl chloride or bromide as part of the catalyst.

For the third ingredient of our catalysts we use carboxylic acid amides in which the amino group is substituted by at least one substituent, i. e. amides derived from primary or secondary amines. Again here it is not very important which carboxylic acid amide is used in our invention because in the course of the reaction finally a carboxylic acid amide will be formed, wherein the carboxylic acid radicle corresponds to that of the carboxylic acid formed in the carbonylation, and wherein the substituents of the amino group are corresponding to the alcohol used as starting material. To cite an example, when carbonylating methanol the carboxylic acid amide which has been used in the beginning will be converted finally to acetic acid mono- and dimethyl amide. Since our invention foresees the repeated use of the catalyst mixture, it is of minor consequence from which amide we have started. To make the course of the reaction less complicated, however, we prefer to use a catalyst which contains already the carboxylic acid amide which will be finally formed anyway.

Since our invention is concerned mainly with the carbonylation of such alcohols which contain in addition to the hydroxy group only carbon and hydrogen, we use for the formation of the carboxylic acid amide such carboxylic acids which contain in addition to the carboxylic acid group only carbon and hydrogen. The same is true with reference to the substituents in the amino group of the carboxylic acid amide.

To cite a few examples of amides, we may use in the performance of our invention, we name acetic acid mono- and dimethyl amide, diethyl amide, or dibutyl amide, acetic acid pyrrolidide, propionic acid hexamethylene imide, diacetyl methyl amine, methyl urea pyrrolidone, methyl pyrrolidone, or dimethyl formamide.

The catalysts described have various advantages over those conventionally used in such carbonylations. Generally speaking, it is possible to obtain the same yields and conversions with chlorine and bromine as compared with the known iodine catalysts. They remain active for a long time because they are obtained as distillation residue and may be used again without purification. Another advantage resides in the fact that the course of the reaction is so directed as to form very small amounts of higher boiling by-products.

We prefer to carry out the reaction at temperatures between 70° and 250° C., in particular between 170° and 230° C. Higher temperatures, e. g. up to 300° C., may also be used but ether formation is more pronounced under these conditions. We use superatmospheric pressure, preferably pressures above 50 or better 100 atmospheres and most preferably in the range between 200 and 700 atmospheres. There is no principal obstacle against using higher pressure, such as 800 atmospheres.

The carbon monoxide used may be pure; it may also contain other gases, such as nitrogen, methane, carbon dioxide and/or hydrogen. When working with a mixture of carbon monoxide with other gases, it is recommended to keep the minimum concentration of carbon monoxide at 10 percent. The ratio between carbon monoxide and hydrogen, if this is present, has some influence on the nature of the reaction product. When working with an excess of carbon monoxide over hydrogen, e. g. with at least 60 parts by volume of CO and at most 40 parts of $H_2$, the main products are carboxylic acids and their esters. When using higher hydrogen concentrations in the carbonylation of alcohols the reaction product tends to contain more aldehydic substances. The carbon monoxide or the carbon monoxide-hydrogen mixture, respectively, should be substantially free from hydrogen sulfide.

The reaction may be carried out discontinuously, e. g. in pressure-tight vessels. When starting from an alcohol they should be made from stainless steel or lined with corrosion-resistant material. We may also work continuously. In all cases there is no necessity to carry on the action of carbon monoxide on the starting material until all of the latter has been converted. We sometimes prefer to carry on the reaction until only part of the starting material has been converted, separate the unchanged material from the reaction product and lead it back to the reaction. The preferred method of recovering the reaction products is by fractional distillation, in some cases under superatmospheric pressure and in other cases under reduced pressure. The conventional distillation techniques may be used, such as using azeotropic distillation or distilling in the presence of steam. The catalyst used will be found in most cases substantially unchanged in the distillation residue. As a rule, it may be used again without further purification.

While the amount of catalyst used is not an essential feature of our process, we prefer to use a concentration of between 0.1 and 15 percent by weight of cobalt in the form of salts, calculated on the starting material. The amount of halogen may be in the same order of magnitudes. The carboxylic acid amide is preferably used in a higher amount, e. g. between 10 and 100 percent by weight, calculated on the alcohol. Since the starting material is usually used in excess, the use of an additional solvent may be avoided. In principle such solvents, e. g. hydrocarbons, esters, phenols, ethers, N-alkyl lactams, or in particular the reaction products, e. g. the esters, may be employed.

The reaction runs most smoothly when starting with methanol. However, it may be also applied with satisfactory results to saturated mono- and bivalent alcohols of 2 to 6 carbon atoms, such as ethanol, the propanols, butanols and pentanols, ethylene glycol, propylene glycol and the butanediols. It is also possible to start from aralipathic or cycloaliphatic alcohols. We may also use mixtures of saturated aliphatic alcohols, as they are obtained in the hydration of olefin mixtures. The alcohols should contain in addition to the hydroxy group or groups only carbon and hydrogen and be free from olefinic or acetylenic linkages.

The following examples will further illustrate how this invention may be carried out in practice. The invention, however, is not restricted to these examples. The parts are by weight.

*Example 1*

A solution of 40 parts of cobalt acetate, 150 parts of dimethyl acetamide and 40 parts of ethyl bromide in 250 parts of methanol are mixed with 25 parts of methyl acetate. The mixture is charged into a high presure vessel, heated to 200° to 205° C. and put under a pressure of 700 atmospheres of carbon monoxide which may contain up to 10 percent of hydrogen. Carbon monoxide is replenished corresponding to the amount used up by the reaction mixture. After 9 hours the reaction is finished. At that time the liquid reaction product has a weight of 618 parts. A crude distillation thereof yields 490 parts of a fraction (B. P.=105°–150° C.) which contains 79 percent of free acetic acid and 5.2 percent of methyl acetate. The balance consists mainly of dimethyl acetamide which may be separated off in a second distillation from the bottom of the column and brought back into the reaction.

The residue obtained in the crude distillation amounts to 105 parts. It is replenished by 50 parts of dimethyl acetamide and again used for the carbonylation of 250 parts of methanol and 25 parts of methyl acetate at 200° to 205° C. under 700 atmospheres. In 12 hours 582 parts of a liquid product are obtained. It yields by distillation 354 parts of a product containing 92 percent of acetic acid and 6.4 percent of methyl acetate. The distillation residue (catalyst) of 190 parts is used again as a catalyst without further treatment under the same conditions as above. The reaction product is 652 parts of a liquid which yields 354 parts of a crude distillate (B. P.=60°–150° C.) with a content of 9.16 percent of acetic acid and 6.35 percent of methyl acetate. 200 parts of a distillation residue are obtained which may be used again several times without further treatment.

Even after using the catalyst for 11 times its activity remains so high that 250 parts of methanol take up almost 200 parts of CO in the course of 7 to 10 hours. In all these cases the content of the crude distillate from the reaction product of acetic acid amounts to almost 95 percent.

Reduction of the pressure to 500 atmospheres give qualitatively the same results, requiring only an extension of the reaction time.

*Example 2*

A mixture of 150 parts of dimethyl acetamide or dimethyl urea, 40 parts of ethyl bromide, 20 parts of cobalt acetate, 150 parts of methyl acetate and 20 parts of methanol is heated in a pressure-tight vessel to 200° to 215° C. while pressing in carbon monoxide containing some percent of hydrogen under 700 atmospheres. After 7 hours gas is no longer absorbed. The reaction product now has a weight of more than 600 parts. By distillation of the reaction product the following fractions are obtained:

I. B. P. 60°–90° C. 156 parts containing 8 percent of acetic acid, 5 percent of acetic acid anhydride, 87 percent of methyl aceate.

II. B. P. 93°–148° C. 89 parts containing 53 percent of acetic acid, 27 percent of acetic acid anhydride, 12.7 percent of methyl acetate.

III. B. P. 150°–170° C. 147 parts containing 43 percent of acetic acid, 21 percent of acetic acid anhydride, and 8 percent of methyl acetate.

*Example 3*

A mixture of 150 parts of dimethyl acetamide, 40 parts of diacetyl methyl amine, 20 parts of cobalt acetate, 40 parts of ethyl bromide, and 250 parts of methanol is heated in a pressure-tight vessel to 200° to 220° C. while pressing in carbon monoxide containing 5 percent of hydrogen under 700 atmospheres. The reaction is finished after 5 hours. The reaction product (640 parts) is distilled, thereby first removing 110 parts of dimethyl ether. The crude distillate contains the following fractions:

I. B. P. 40°–90° C. 80 parts containing 23 percent of acetic acid, 0.6 percent of acetic anhydride and 62 percent of methyl acetate.

II. B. P. 90°–125° C. 70 parts containing 68 percent of acetic acid and 16.3 percent of methyl acetate.

III. B. P. 140°–156° C. 85 parts containing 85 percent of acetic acid and 4 percent of methyl acetate.

The distillation residue may be used again as catalyst

Example 4 a. A mixture of 150 parts of dimethyl acetamide, 40 parts of cobalt acetate and 40 parts of ethyl bromide which has been used already five times for the synthesis of acetic acid for methanol and CO according to Example 1 is mixed with 75 parts of methanol and 150 parts of dimethyl ether and heated in a pressure-tight vessel at 200° to 215° C. with moist carbon monoxide under 700 atmospheres. The reaction product (510 parts) yields by a crude distillation 320 parts of a fraction containing 81.8 percent of acetic acid and 8.4 percent of methyl acetate.

b. 250 parts of methanol are admixed with 25 parts of methyl acetate and with 195 parts of a catalyst consisting of 115 parts of dimethyl acetamide, 40 parts of cobalt acetate and 40 parts of ethyl bromide which catalyst has been used already four times for the same acetic acid synthesis. This mixture is treated with carbon monoxide at 210° to 220° C. under 700 atmospheres pressure for an hour. The reaction mixture (652 parts) is distilled thereby obtaining 442 parts of a crude distillate containing 94.4 percent of acetic acid and 4.5 percent of methyl acetate. The yield of acetic acid is 89 percent of the theory.

When working under 350 atmospheres, the reaction takes about 21 hours.

Example 5

250 parts of n-butanol, 200 parts of acetic acid di-n-butyl amide, 40 parts of n-butyl chloride and 35 parts of cobalt valerate are treated at 180° to 220° C. with carbon monoxide under 700 atmospheres. In working up the reaction mixture there is obtained acetic acid, valeric acid, n-butyl acetate and n-butyl valerate. The distillation residue was used again as catalyst for the carbonylation of 250 parts of n-butanol. The weight of the reaction mixture increases by 76 parts. By distillation of the reaction mixture 171 parts of a mixture containing 6 percent valeric acid and 89 percent of n-butyl valerate are obtained.

When using the catalyst which now contains substantially only valeric acid di-n-butyl amide as amide, one obtains a reaction mixture from which a fraction containing 10 percent of free valeric acid and 83 percent of n-butyl valerate may be distilled off.

Example 6

A mixture of 20 parts of iso-valeric acid di-iso-butyl amide, 40 parts of cobalt iso-valerate, 40 parts of secondary butyl chloride and 250 parts of secondary butanol is treated in the manner described in Example 5 with carbon monoxide. From the reaction mixture 110 parts of a fraction are distilled off which contains 20 percent iso-valeric acid and 60 percent of iso-butyl-iso-valerate.

Example 7

The catalyst is prepared by mixing 40 parts of tertiary butyl chloride, 40 parts of cobalt acetate and 40 parts of acetic acid di-tertiary butyl amide. This catalyst is used for the carbonylation of tertiary butanol with carbon monoxide at 180° to 200° C. under from 350 to 700 atmospheres pressure. The reaction product contains tertiary butyl pivalate besides free pivalic acid, acetic acid and tertiary butyl acetate. In the catalyst the acetic acid has been replaced by pivalic acid.

When using the catalyst again for the carbonylation of 200 parts of tertiary butanol under 700 atmospheres at 180° to 200° C. there is obtained a product which yields on distillation 134 parts of a fraction, boiling between 70° and 110° C. at 30 millimeters pressure, containing 54 percent of pivalic acid and 10 percent of tertiary butyl pivalate, the balance being tertiary butanol.

Example 8

A mixture of 200 parts of benzyl alcohol, 200 parts of phenyl acetic acid benzyl amide, 40 parts of cobalt phenyl acetate and 50 parts of benzyl chloride is treated with carbon monoxide under 700 atmospheres at from 200° to 220° C. By distillation of the reaction product there is obtained a fraction, boiling between 75° and 77° C. under 20 atmospheres pressure, which contains phenyl acetic acid.

Example 9

As a catalyst there is used a mixture of 150 parts of adipic acid pyrrolidide, 50 parts of cobalt adipate and 50 parts of 1.4-dichloro butane. When treating 200 parts of 1.4-butanediol in the manner described in Example 5 in the presence of this catalyst there is obtained a polyester formed from adipic acid and butanediol.

Example 10

A mixture of 250 parts of methanol, 200 parts of acetyl p-toluidine, 40 parts of cobalt acetate and 35 parts of methyl chloride is treated with carbon monoxide under 700 atmospheres at 180° to 230° C. in a pressure-tight vessel. The reaction is finished after 14 hours. Distillation of the reaction mixture yields 260 parts of acetic acid and methyl acetate.

When repeating the reaction while using the distillation residue as a catalyst there is obtained a reaction product which yields by distillation 44 parts of an 86 percent methyl acetate and 340 parts of a mixture containing 49 percent of acetic acid and 35 percent of methyl acetate.

When using under the same conditions the acetic acid monomethyl amide as a catalyst ingredient there are obtained 240 parts of a mixture of 34 percent acetic acid and 47 percent of methyl acetate.

The pressure may be lowered to 200 atmospheres with the same result, provided the reaction time is extended to 30 hours.

Example 11

A mixture of 2 moles of acetyl p-toluidine, 1 mole of cobalt acetate, 0.2 mole of methyl chloride and 2 moles of paracresol is treated with CO under 700 atmospheres at 210° C. The mixture thus obtained is homogeneous and liquid.

250 parts thereof are used as a catalyst in the carbonylation of 250 parts of methanol with carbon monoxide under 700 atmospheres at 200° to 220° C. The reaction mixture takes up 87 parts of CO in the course of 11 hours. (When working under 200 atmospheres it takes 28 hours.) By distilling the crude reaction mixture there are obtained 210 parts of a fraction containing 80 percent of methyl acetate and 4 percent of acetic acid, and a fraction containing 2 percent of methyl acetate and 70 percent of acetic acid.

The distillation residue may be used repeatedly as a catalyst, it stays oily and liquid during the repeated performance. There has only to be added from time to time some methyl chloride.

Example 12

A high pressure vessel is charged with a mixture of 150 parts of dimethylacetamide, 40 parts of cobalt acetate, 200 parts of methanol, 25 parts of methyl acetate and 30 parts of ethyl chloride. Carbon monoxide is pressed in under 150 atmospheres pressure, the whole is then heated to 210° C. and the pressure increased to 700 atmospheres CO. The pressure is maintained at this level by replenishing the carbon monoxide. In the course of 15 hours 212 parts of CO are taken up. By distillation of the reaction product there is obtained a fraction (65 parts), boiling between 10° and 110° C., which contains besides methanol, ethyl chloride, methyl acetate and acetic acid some cobalt carbonyl. This fraction is given back into a new charge. The next fraction, boiling between 110° and 155° C., amounts to 391 parts and consists of a little methyl acetate (3 or 4 percent) and 92 percent of acetic acid, the balance being a little dimethyl acetamide. Traces of cobalt carbonyl which are contained in the second crude fraction of the acetic acid may be removed before a second distillation by adding 0.1 percent of chlorine. The cobalt then will be found in the distillation residue as cobalt chloride.

We claim:

1. An improved process for the production of carboxylic acids and their esters which comprises reacting carbon monoxide with an alcohol selected from the group consisting of lower alkyl alcohols, lower alkyl diols, and phenyl-lower alkyl-alcohols at temperatures between 70° and 250° C. and under a pressure of from 50 to 800 atmospheres in the presence of a cobalt salt of an acid selected from the group consisting of lower alkyl carboxylic acids and phenyl-lower alkyl-carboxylic acids, a halogenide selected from the group consisting of lower alkyl chlorides, phenyl-lower alkyl-chlorides, lower alkyl bromides, and phenyl-lower alkyl-bromides, and an acid amide selected from the group consisting of lower alkyl carboxylic acid amides, and phenyl-lower alkyl-carboxylic acid amides derived from an amine selected from the group consisting of lower alkyl, phenyl-lower alkyl, saturated heterocyclic, and tolyl primary and secondary amines.

2. An improved process as set forth in claim 1, wherein the reaction temperature is between 170° and 230° C. and the pressure is between 200 and 700 atmospheres.

3. An improved process for the production of carboxylic acids and their esters which comprises reacting carbon monoxide with an alcohol selected from the group consisting of lower alkyl alcohols, lower alkyl diols, and phenyl-lower alkyl-alcohols at temperatures between 70° and 250° C. and under a pressure of from 50 to 800 atmospheres in the presence of a cobalt salt of the carboxylic acid obtainable by carbonylation of the alcohol used as starting material, a halogenide selected from the group consisting of chlorides and bromides obtainable by the replacement of a hydroxy radical with a halide radical in the alcohol used as starting material, and a carboxylic acid amide in which the carboxylic acid radical is derived from an acid obtainable by carbonylation of the alcohol used as starting material and in which the amido radical is derived from an amine selected from the group consisting of primary and secondary amines, the alkyl radical of said amine corresponding to the alkyl radical of the alcohol used as starting material.

4. An improved process as set forth in claim 3, wherein the reaction temperature is between 170° and 230° C. and the pressure is between 200 and 700 atmospheres.

5. An improved process as set forth in claim 3, wherein the halogenide is a chloride.

6. An improved process as set forth in claim 3, wherein the halogenide is a bromide.

7. An improved process for the production of acetic acid and methyl acetate which comprises reacting carbon monoxide with methanol at a temperature of from about 170° to 230° C. and a pressure of from about 500 to 700 atmospheres in the presence of cobalt acetate, dimethyl acetamide, and ethyl bromide.

8. An improved process for the production of acetic acid and methyl acetate which comprises reacting carbon monoxide with methanol at a temperature of from about 170° to 230° C. and a pressure of from about 500 to 700 atmospheres in the presence of cobalt acetate, dimethyl acetamide, methyl acetate and ethyl bromide.

References Cited in the file of this patent

UNITED STATES PATENTS

| | | |
|---|---|---|
| 2,462,738 | Gresham | Feb. 22, 1949 |
| 2,593,440 | Hagemeyer | Apr. 22, 1952 |
| 2,650,246 | Thomas et al. | Aug. 25, 1953 |
| 2,658,075 | Reppe et al. | Nov. 3, 1953 |
| 2,727,902 | Reppe et al. | Dec. 20, 1955 |

UNITED STATES PATENT OFFICE

CERTIFICATE OF CORRECTION

Patent No. 2,805,248                                               September 3, 1957

Herbert Friederich et al.

It is hereby certified that error appears in the printed specification of the above numbered patent requiring correction and that the said Letters Patent should read as corrected below.

Column 1, line 23, for "It still" read -- In still --; column 4, line 24, for "9.16 percent" read -- 91.6 percent --; line 50, for "aceate" read -- acetate --; column 7, line 1, for "(3 or 4 percent)" read -- (3 to 4 percent) --.

Signed and sealed this 29th day of October 1957.

(SEAL)

Attest:

KARL H. AXLINE
Attesting Officer

ROBERT C. WATSON
                                                                                                                               Commissioner of Patents